UNITED STATES PATENT OFFICE.

CHARLES E. EGAN, OF COLUMBUS, OHIO, ASSIGNOR, BY DIRECT AND MESNE ASSIGNMENTS, TO WILLIAM Y. MILES AND S. W. SMITH, BOTH OF SAME PLACE.

SOLUTION FOR VOLTAIC BATTERIES.

SPECIFICATION forming part of Letters Patent No. 381,542, dated April 24, 1888.

Application filed September 8, 1887. Serial No. 249,194. (No specimens.)

*To all whom it may concern:*

Be it known that I, CHARLES E. EGAN, a citizen of the United States, residing at Columbus, in the county of Franklin and State of Ohio, have invented a certain new and useful Improvement in Solutions for Voltaic Batteries, of which the following is a specification.

My invention relates to single fluid batteries of that class which will not polarize, and has for its object the production of a solution which will preserve the electro-motive force of the cell, will be clean in its action, free from the formation of salts which materially change the resistance of the cell, and yield a current of high electro-motive force and be adapted for closed or open circuit work.

To this end my invention is embodied in a fluid composed of ferric sulphate, chromic acid, and water. A considerable range of proportions of these materials may be used with good practical results. I have found a mixture of the following proportions to yield great efficiency: Dry chromic acid, one-fourth ounce; ferric sulphate, $Fe_2(SO^4)3$ or $Fe_3(SO^4)4$, two ounces; water, one quart. With zinc as the soluble electrode this solution yields a current of high electro-motive force and great constancy. The elements may be allowed to remain in the fluid which does not seriously attack the soluble element on open circuit.

Just what reaction takes place in the battery I am not at present prepared to say positively; but the two fluids act more efficiently together than either does alone. The electro-motive force of a cell so excited has an internal resistance of something over one-half ohm and an electro-motive force of about 2.07 volts, thus yielding a current of about four ampères. The zinc products of the battery seem to be insoluble and fall to the bottom of the cell.

Having thus described my invention, what I claim, and desire to secure by Letters Patent, is—

1. An excitant for a galvanic battery containing ferric sulphate and a chromic compound.

2. An excitant for a galvanic battery consisting of ferric sulphate, chromic acid, and water.

CHARLES E. EGAN.

In presence of—
O. N. N. PARKER,
GEO. B. FRAVEL.